E. BOLLINGER.
Hay-Loader.

No. 224,634.  Patented Feb. 17, 1880.

WITNESSES  
INVENTOR  
Ephraim Bollinger,  
Gilmore, Smith & Co.,  
ATTORNEYS

UNITED STATES PATENT OFFICE.

EPHRAIM BOLLINGER, OF NEOSHO RAPIDS, KANSAS.

HAY-LOADER.

SPECIFICATION forming part of Letters Patent No. 224,634, dated February 17, 1880.

Application filed August 9, 1879.

*To all whom it may concern:*

Be it known that I, EPHRAIM BOLLINGER, of Neosho Rapids, in the county of Lyon and State of Kansas, have invented a new and valuable Improvement in Hay-Loaders; and I do hereby declare that the following is a full, clear, and exact description of the construction and operation of the same, reference being had to the annexed drawings, making a part of this specification, and to the letters and figures of reference marked thereon.

Figure 1:
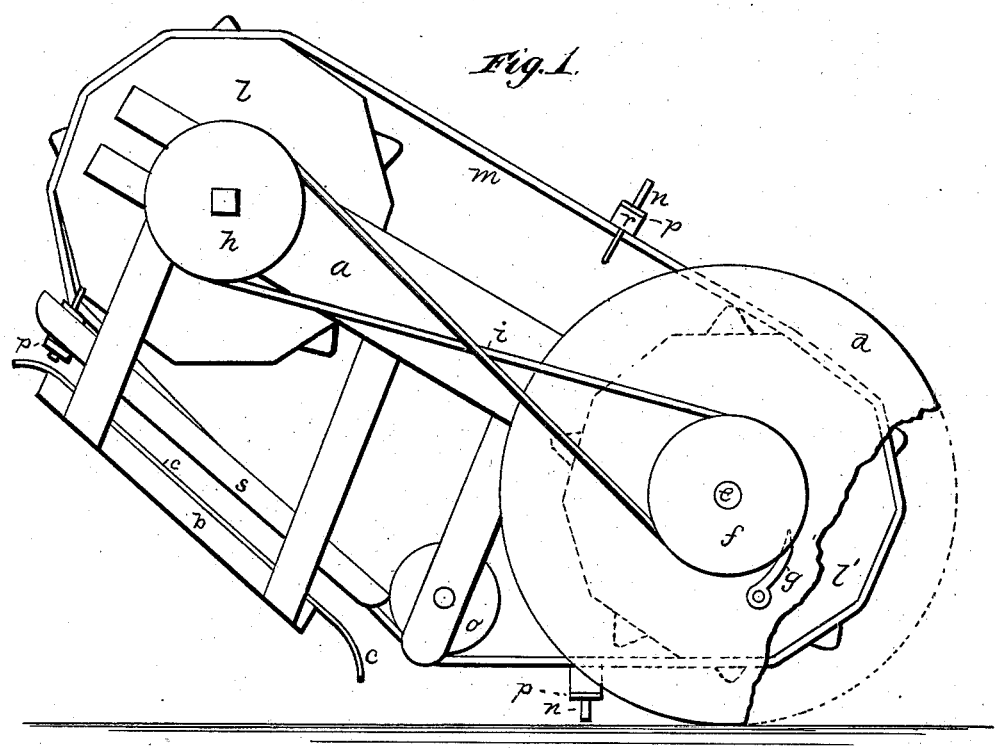
Figure 2:
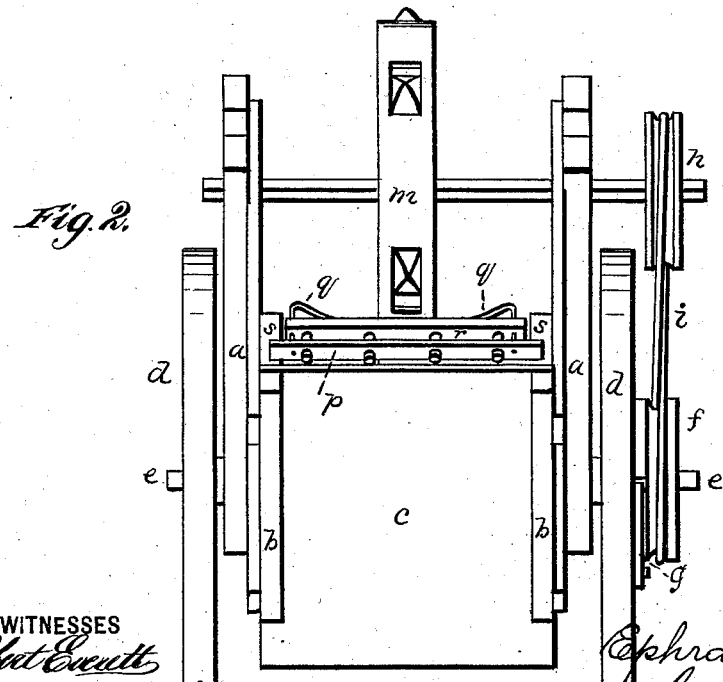

Figure 1 of the drawings is a side elevation of my improved hay-loader, a portion of one of the driving-wheels being broken away. Fig. 2 is an end view of the same.

The nature of my invention consists in an improved hay-loader designed to be connected with and drawn along by an ordinary hay-wagon, the construction and arrangement of its operative parts being such that as the machine is drawn over the field the hay will be raked from the swath by a series of rakes upon an endless belt, then carried upward along an inclined chute to an elevation above the wagon-body, and at such point discharged from the rake-teeth, all as hereinafter more fully described, and distinctly specified in the claim.

The frame of the machine, as herein illustrated, is mainly composed of the inclined side bars, $a\ a$, suitably connected and adapted to constitute bearings for the shafts of the driving and pulley wheels, and the bars $b\ b$, connected with the said bars $a$ and forming supports for the chute $c$.

The driving-wheels $d\ d$ are loosely mounted upon shaft $e$, so that by applying any suitable stop device to the shaft, which also rotates in its bearings, the machine may be drawn along without motion being communicated to the remaining operative parts of the machine.

Upon one end of shaft $e$ is rigidly secured a pulley-wheel, $f$, a portion of the said wheel being provided with teeth, so that when a pawl, $g$, upon the driving-wheel on this side of the machine is brought into engagement therewith the said pulley-wheel $f$ will be rotated with the driving-wheel, and motion communicated to an upper pulley-wheel, $h$, by means of a band or cord, $i$. This cord is twisted, as shown, so that the rotation of wheel $h$ and the shaft upon which it is rigidly secured will be in a direction reverse to that of wheel $f$.

Upon the shaft of wheel $h$ is rigidly secured a sprocket-wheel, $l$, and upon the shaft of the driving-wheels $d$ is loosely mounted a similar wheel, $l'$, a band or chain, $m$, being arranged to pass around the two said wheels, as clearly illustrated in Fig. 1 of the drawings.

Upon the endless belt or chain $m$, I secure a suitable number of cross-bars provided with rake-teeth $n$, which I propose making of spring-wire; and in order to insure the accumulation of a sufficient quantity of hay by each set of rake-teeth, I arrange between the rear sprocket-wheel and the lower end of the chute a guide-roller, $o$, which not only effects this result, but also maintains the chain and rake-teeth in the required line of travel over the chute.

In order to discharge the hay from the rakes at a point above the upper end of the chute $c$, I provide each rake with a slat, $p$, which is secured to the cross-bar or rake-head by springs $q$, and provided with notches or holes which fit over the teeth $n$. These slats extend beyond the ends of the rake-heads $r$, so that when the rakes have passed under the guide-roller at the bottom of the chute the projecting ends of the slats $p$ will pass under the side bars, $s$, which are secured to the frame of the machine. These bars are either enlarged or else set more closely to the chute at their upper than at their lower ends, so that as the rakes arrive at the upper limit of the bars the slats will be forced outward by the bars $s$ and toward the ends of the teeth, thereby discharging the hay therefrom into the wagon, which is connected with the hay-loader in any suitable manner.

As soon as the rakes have passed the upper ends of bars $s$ they will be retracted upon the rake-heads by their springs.

What I claim, and desire to secure by Letters Patent, is—

The herein-described series of rakes secured upon band $m$, and provided with the slats $p$ and springs $q$, in combination with the bars $s$, pulley-wheels, and driving mechanism, substantially as specified.

In testimony that I claim the above I have hereunto subscribed my name in the presence of two witnesses.

EPHRAIM BOLLINGER.

Witnesses:
 CHAS. FLETCHER,
 P. P. HILLERMAN.